United States Patent
Quinones

[19]
[11] Patent Number: 5,958,805
[45] Date of Patent: Sep. 28, 1999

[54] TEAR/PUNCTURE RESISTANT SEMI-LAMINATE MATERIAL

[76] Inventor: Victor Manuel Quinones, 7123 Horizon Peak, San Antonio, Tex. 78233

[21] Appl. No.: 09/061,253

[22] Filed: Apr. 17, 1998

[51] Int. Cl.⁶ ..................................................... B32B 15/00
[52] U.S. Cl. ........................... 442/236; 442/237; 428/198; 428/594
[58] Field of Search .................................... 442/236, 237; 428/594, 198

[56] References Cited

U.S. PATENT DOCUMENTS

| | | |
|---|---|---|
| 2,742,388 | 4/1956 | Russell . |
| 3,130,647 | 4/1964 | Anderson et al. . |
| 3,715,251 | 2/1973 | Prentice . |
| 4,668,566 | 5/1987 | Braun . |
| 4,748,070 | 5/1988 | Beehler . |
| 4,749,423 | 6/1988 | Vaalberg et al. . |
| 5,272,023 | 12/1993 | Yamamoto et al. . |
| 5,342,469 | 8/1994 | Bodford et al. . |
| 5,424,115 | 6/1995 | Stokes . |

FOREIGN PATENT DOCUMENTS

| | | |
|---|---|---|
| 639751 | 4/1962 | Canada . |
| 1307386 | 9/1962 | France . |
| 1490626 | 8/1963 | Germany . |
| 52-43594 | 5/1977 | Japan . |
| 60-68934 | 4/1985 | Japan . |

*Primary Examiner*—Richard Weisberger
*Attorney, Agent, or Firm*—Richard C. Litman

[57] ABSTRACT

A tear/puncture resistant semi-laminate material comprising a layer of woven polyethylene bonded to a layer of non-woven polyethylene film impregnated with a volatile corrosion inhibitor. The layers are not bonded with a uniform layer of adhesive, but are semi-laminated by bonding at points or in strips at the edges of the respective layers or at discrete, discontinuous intervals across the width of the material. In an alternative embodiment, polypropylene is substituted for polyethylene.

14 Claims, 1 Drawing Sheet

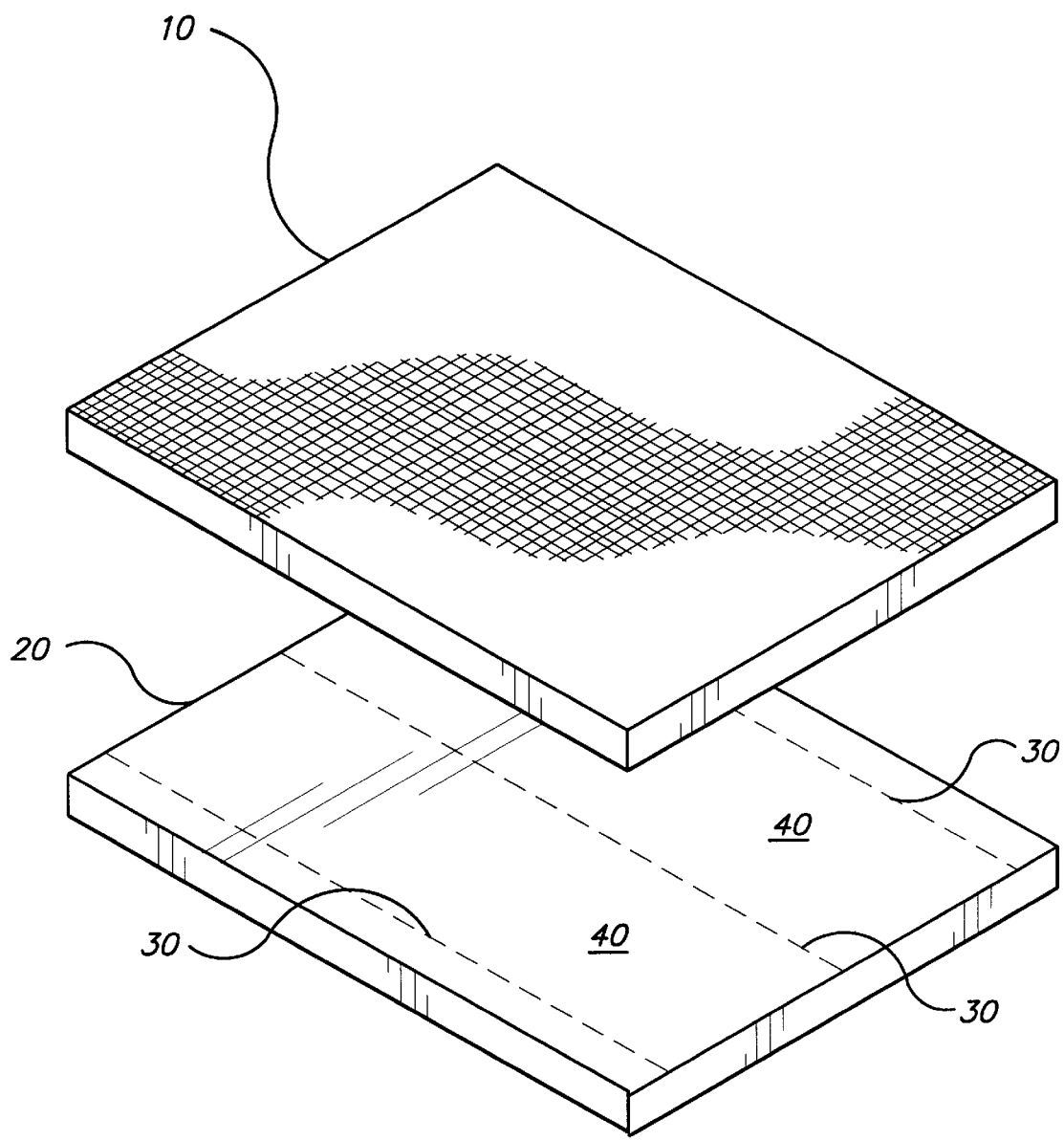

TEAR/PUNCTURE RESISTANT SEMI-LAMINATE MATERIAL

BACKGROUND OF THE INVENTION

1. Field of the Invention

The present invention relates to material which may be used to wrap rolls or sheets of metal that is both tear and puncture resistant, and particularly to laminated thermoplastic materials.

2. Description of the Related Art

Various materials have been made with combined layers of material so that the final product exhibits the properties of both layers. No materials exist, however, possessing the unique properties of the present invention, including tear resistance, puncture resistance and corrosion inhibitors U.S. Pat. No. 2,742,388 issued Apr. 17, 1956 to A. W. Russell discloses a method of bonding and curing 2 or more plastic sheets to provide enough rigidity for use as structural members. The sheets are bonded at the edges with a thermosetting resin and a cellophane strip longitudinally between the edges to form a pocket in which a shaping tool may be inserted with the application of heat to soften and shape the fibers.

U.S. Pat. No. 3,130,647 issued Apr. 28, 1964 to W. E. Anderson, et al. describes a method of bonding a resilient or fragile layer to a relatively nonresilient layer, such as paper, by heat bonding with the application of pressure. U.S. Pat. No. 3,715,251 issued Feb. 6, 1973 to J. S. Prentice teaches lamination of nonwoven mats of thermoplastic fibers by adhesives or point welding to produce a laminated nonwoven sheet of material.

U.S. Pat. No. 4,668,566 issued May 26, 1987 to Ralph V. Braun discloses a multilayer material comprising a layer of polyethylene bonded to a layer of polypropylene to form a nonwoven fabric. U.S. Pat. No. 4,748,070 issued May 31, 1988 to David C. Beehler teaches a polypropylene web bonded to a polypropylene film to increase the tear strength of the film. U.S. Pat. No. 4,749,423 issued Jun. 7, 1988 to Vaalburg, et al. describes a method of bonding a nonwoven web of thermoplastic fibers.

U.S. Pat. No. 5,272,023 issued Dec. 21, 1993 to Yamamoto, et al. describes a method of making a hot melt adhesive fiber sheet. U.S. Pat. No. 5,342,469 issued Aug. 30, 1994 to Bodford, et al. discloses a method of laminating a spunbond web of polyethylene fiber to a film using adhesive in which the adhesive layer is discontinuous. U.S. Pat. No. 5,424,115 issued Jun. 13, 1995 to Ty J. Stokes teaches a method of point bonding sheets of conjugate fibers such as polyolefin and polyamide fibers.

Canadian Patent 639,751 published Apr. 10, 1962 teaches a method of spot welding polyethylene film sheets. French Patent 1,307,386 published Sept. 17, 1962 describes methods of bonding sheets of plastic materials. German Patent 1,490,626 issued Aug. 13, 1963 describes an insulating paper for high tension wires bonded by spot adhesives. Japanese Patent 52-43594 describes bonding paper or cloth to a polypropylene base by adhesives. Japanese Patent 60-68934 describes a waterproof laminate composed of three layers, the second being polyurethane.

None of the above inventions and patents, taken either singularly or in combination, is seen to describe the instant invention as claimed. None of the above inventions and patents describe a material combining tear and puncture resistance with corrosion inhibition suitable for wrapping rolls or sheets of metals such as steel and aluminum. Thus a tear/puncture resistant semi-laminate material solving the aforementioned problems is desired.

SUMMARY OF THE INVENTION

In steel mills it is useful to wrap or separate rolls or sheets of steel for protection during storage or transport. Currently the material used is composed of a layer of woven polyethylene bonded to a 1 mil extrusion of film and a reinforcing ply of kraft paper. When tears or punctures develop, the kraft paper tends to absorb water, and consequently the steel can become corroded.

Further, the material currently used is prepared by extruding the film over the layer of woven polyethylene and heat bonding the layers by processing the combined layers through the nip of rollers under pressure to produce a material uniformly bonded throughout its length and width. By uniformly bonding the two layers of material together, the material loses some of its elasticity.

The material of the present represents an improvement in the materials currently available in the steel industry, comprising a layer of woven high density polyethylene, bonded at points or in strips around its edges or at discrete, discontinuous intervals across its width to a layer of low density polyethylene film to form sheets 60" to 120" wide. The layer of polyethylene film is impregnated with a volatile corrosion inhibitor.

Accordingly, it is a principal object of the invention to provide a tear and puncture resistant material for wrapping metals for storage or transport having improved moisture protection by layering sheets so that a tear or puncture in one layer does not necessarily extend to another layer.

It is another object of the invention to provide a tear and puncture resistant material for wrapping metals for storage or transport having greater elasticity than materials currently used in the industry by providing a material produced using a method of lamination in which the properties of one layer are not affected by the properties of another layer or by the process of lamination itself.

It is a further object of the invention to provide a material which is tear and puncture resistant and which also inhibits corrosion by using a material having a layer impregnated with a corrosion inhibitor.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

The sole FIGURE is an environmental, perspective view of a tear/puncture resistant semi-laminate material according to the present invention with the layers separated to show the bonding of the layers.

Similar reference characters denote corresponding features consistently throughout the attached drawing.

DETAILED DESCRIPTION OF THE PREFERRED EMBODIMENTS

The present invention relates to a material which is tear and puncture resistant, having sufficient strength and elasticity to prove useful in the metals industry, where it may be used for wrapping rolls or sheets of steel, aluminum, and other newly milled metals to provide protection from the weather during storage and transport.

The material of the present invention is fabricated from polymeric materials, specifically, thermoplastic films and fibers. In the preferred embodiments, the layers of the material are composed entirely of polyethylene fibers and films, or entirely from polypropylene fibers and films. Polyethylene and polypropylene are considered desirable for this application because among their many other properties, they are recyclable, which is why layers of polyethylene and polypropylene are not mixed.

In the preferred embodiment, as shown in the FIGURE, the invention comprises a material having two layers. The top layer 10 is a layer of woven high density polyethylene fibers having a thickness between 3 mils and 7 mils, preferably 5 mils. This layer provides multi-directional strength, i.e., tear resistance in both the machine direction and the cross direction. Fibers running in the machine and cross directions, which may be in the ratio of about 8:4 lines per square inch, provide this multi-directional strength. The woven polyethylene imparts ease of handling to the material.

While the layer of woven polyethylene 10 imparts significant benefits to the material, nevertheless, it is subject to breakage, viz., when great tensile forces are applied to it. Therefore, the second layer 20 is a layer of extruded, nonwoven, low density polyethylene film having a thickness between 1 mil and 6 mils, preferably 3 mils. The layer of polyethylene film 20 gives the material puncture resistance. The polyethylene film is water impermeable, providing protection against water and moisture.

The layer of polyethylene film 20 is impregnated with a volatile corrosion inhibitor, which may be sodium nitrite, for example. Steel and other metals are subject to corrosion from exposure to the weather, undergoing oxidation in the presence of water. A variety of methods are used to protect metals from corrosion, such as electroplating, paint, etc. One of the methods used to help prevent corrosion is the use of volatile corrosion inhibitors, such as nitrites, which form a gaseous layer coating the metal and inhibit corrosion by reacting with water to form nitrates.

In the preferred embodiment of the present invention, sodium nitrite is used as the volatile corrosion inhibitor. The sodium nitrite is combined with the polyethylene in the melt and extruded in the polyethylene film. Other volatile corrosion inhibitors are well known in the metals industry and may be used in place of sodium nitrite.

The method of bonding used to laminate the two layers is referred to as semi-lamination. Normally materials to be laminated are coated uniformly throughout their surface are with an adhesive or thermosetting resin, or one layer is extruded over a second layer and the layers are bonded by heat and pressure. By contrast, the material of the present invention is bonded by point welding, by heat bonding, by ultrasonic bonding, by adhesive bonding, or other appropriate conventional methods of bonding standard in the industry, in narrow continuous strips 30 applied to the edges of the layer, and optionally at discrete, discontinuous intervals across the width of the layers, as shown in the FIGURE, defining spaces 40 or pockets.

The process of semi-lamination offers several advantages. Since the layers are not uniformly bonded, the vast majority of the surface area of the two layers is in slidable contact so that the layers tend to slide in relation to each other as the material is wrapped around the metal, so that if a hole develops in the woven layer, in all likelihood it will not have a hole at the same position in the second layer. Hence, any moisture entering through the hole in the first layer tends to be trapped in the spaces 40 or pockets between the layers. Since the polyethylene film is impermeable to water, the metals are protected from exposure to water, unlike materials currently used which employ a reinforcing ply of kraft paper which tends to absorb any water entering through a hole in the top layer. This method of lamination permits the finished material to retain the beneficial properties of the material in each individual layer while enjoying the advantages of combining the layers.

The basis weight of the finished material is approximately 25 lbs. per 1000 square feet. In operation, the metal is wrapped in the material with the third layer closest to the metal. In this manner the metals derive the greatest degree of protection from the layer containing the volatile corrosion inhibitor.

The embodiment described above is composed entirely from layers of polyethylene. It will be understood that alternative embodiments may be made entirely from polypropylene, comprising a layer of woven, tear resistant polypropylene and a layer of polypropylene film impregnated with a volatile corrosion inhibitor, within the specifications set forth above for polyethylene. The advantage of using polyethylene, particularly high density polyethylene, or polypropylene, is that these materials are recyclable.

It is to be understood that the present invention is not limited to the embodiments described above, but encompasses any and all embodiments within the scope of the following claims.

I claim:

1. A tear/puncture resistant semi-laminate material comprising:
   (i) a first layer consisting essentially of woven, high density polyethylene fibers; and
   (ii) a second layer consisting essentially of low density polyethylene film impregnated with a volatile corrosion inhibitor; wherein
   the said layers are bonded together by bonding in narrow strips at the edges of the respective layers and at discrete, discontinuous intervals across the width of said layers.

2. The tear/puncture resistant semi-laminate material according to claim 1, wherein said first layer of woven polyethylene has a thickness of approximately 5 mils.

3. The tear/puncture resistant semi-laminate material according to claim 1, wherein said first layer of woven polyethylene has a thickness of between about 3 mils and about 7 mils.

4. The tear/puncture resistant semi-laminate material according to claim 1, wherein said second layer of polyethylene film has a thickness of approximately 3 mils.

5. The tear/puncture resistant semi-laminate material according to claim 1, wherein said second layer of polyethylene film has a thickness of between about 1 mil and about 6 mils.

6. The tear/puncture resistant semi-laminate material according to claim 1, wherein the volatile corrosion inhibitor impregnated in said second layer of nonwoven polyethylene film comprises sodium nitrite.

7. The tear/puncture resistant semi-laminate material according to claim 1, wherein said first layer of woven polyethylene has a thickness of between about 3 mils and about 7 mils, and said second layer of polyethylene film has a thickness of between about 1 mil and about 6 mils.

8. A tear/puncture resistant semi-laminate material comprising:

(i) a first layer consisting essentially of woven polypropylene fibers; and (ii) a second layer consisting essentially of low density polypropylene film impregnated with a volatile corrosion inhibitor; wherein the said layers are bonded together by bonding in narrow strips at the edges of the respective layers and at discrete, discontinuous intervals across the width of said layers.

9. The tear/puncture resistant semi-laminate material according to claim 8, wherein said first layer of woven polypropylene has a thickness of approximately 5 mils.

10. The tear/puncture resistant semi-laminate material according to claim 8, wherein said first layer of woven polypropylene has a thickness of between about 3 mils and about 7 mils.

11. The tear/puncture resistant semi-laminate material according to claim 8, wherein said second layer of polypropylene film has a thickness of approximately 3 mils.

12. The tear/puncture resistant semi-laminate material according to claim 8, wherein said second layer of polypropylene film has a thickness of between about 1 mil and about 6 mils.

13. The tear/puncture resistant semi-laminate material according to claim 8, wherein the volatile corrosion inhibitor impregnated in said third layer comprises sodium nitrite.

14. The tear/puncture resistant semi-laminate material according to claim 8, wherein said first layer of woven polypropylene has a thickness of between about 3 mils and about 7 mils, and said second layer of polypropylene film has a thickness of between about 1 mil and about 6 mils.

* * * * *